June 14, 1938. R. M. BLAKELY Re. 20,757

TRANSMISSION

Original Filed March 13, 1931 2 Sheets-Sheet 1

Inventor
Richard M. Blakely
Knox Hudson & Kent
attys

June 14, 1938. R. M. BLAKELY Re. 20,757

TRANSMISSION

Original Filed March 13. 1931 2 Sheets-Sheet 2

Inventor
Richard M. Blakely
Kerr Hudson & Kent
attys.

Reissued June 14, 1938

Re. 20,757

UNITED STATES PATENT OFFICE 20,757

TRANSMISSION

Richard M. Blakely, Hamilton, Ohio, assignor, by mesne assignments, to Monopower Corporation, Detroit, Mich., a corporation of Michigan Original No. 1,950,914, dated March 13, 1934, Serial No. 522,229, March 13, 1931. Application for reissue December 14, 1935, Serial No. 54,439

28 Claims. (Cl. 74—330)

This invention relates to improvements in transmissions, particularly transmissions for vehicles.

One of the objects of the invention is the provision of means for performing hydraulically the operations necessary to effect speed changes.

Another object is the provision of a plurality of friction clutches, which may be employed alternatively for the purpose of clutching the engine directly to the driven shaft or for clutching it to different gear trains, these clutches being preferably of a new type comprising a minimum number of parts, and being operable by fluid pressure.

Another object is the provision of a transmission in which the gear shifting operations are greatly simplified, the usual gear shift lever being eliminated.

A further object is the provision of manual means for controlling the flow of pressure fluid to the various clutches, said means being also arranged so that its movement in one direction will bring about the setting and releasing of the lower forward speed clutches one at a time, and finally the setting of the high speed clutch, while its movement in the opposite direction may be caused to set and release the clutches in the reverse order.

Another object is the provision of means to prevent the accidental operation of the reverse gear drive.

Still another object is the provision of means tending normally to throw the transmission into direct drive, said means being capable of being disabled by the operator when he desires to leave the transmission in low, intermediate or reverse gear for a considerable period.

Another object is the provision of means for enabling a single clutch to function for both reverse gear and low gear forward.

Figure 1:
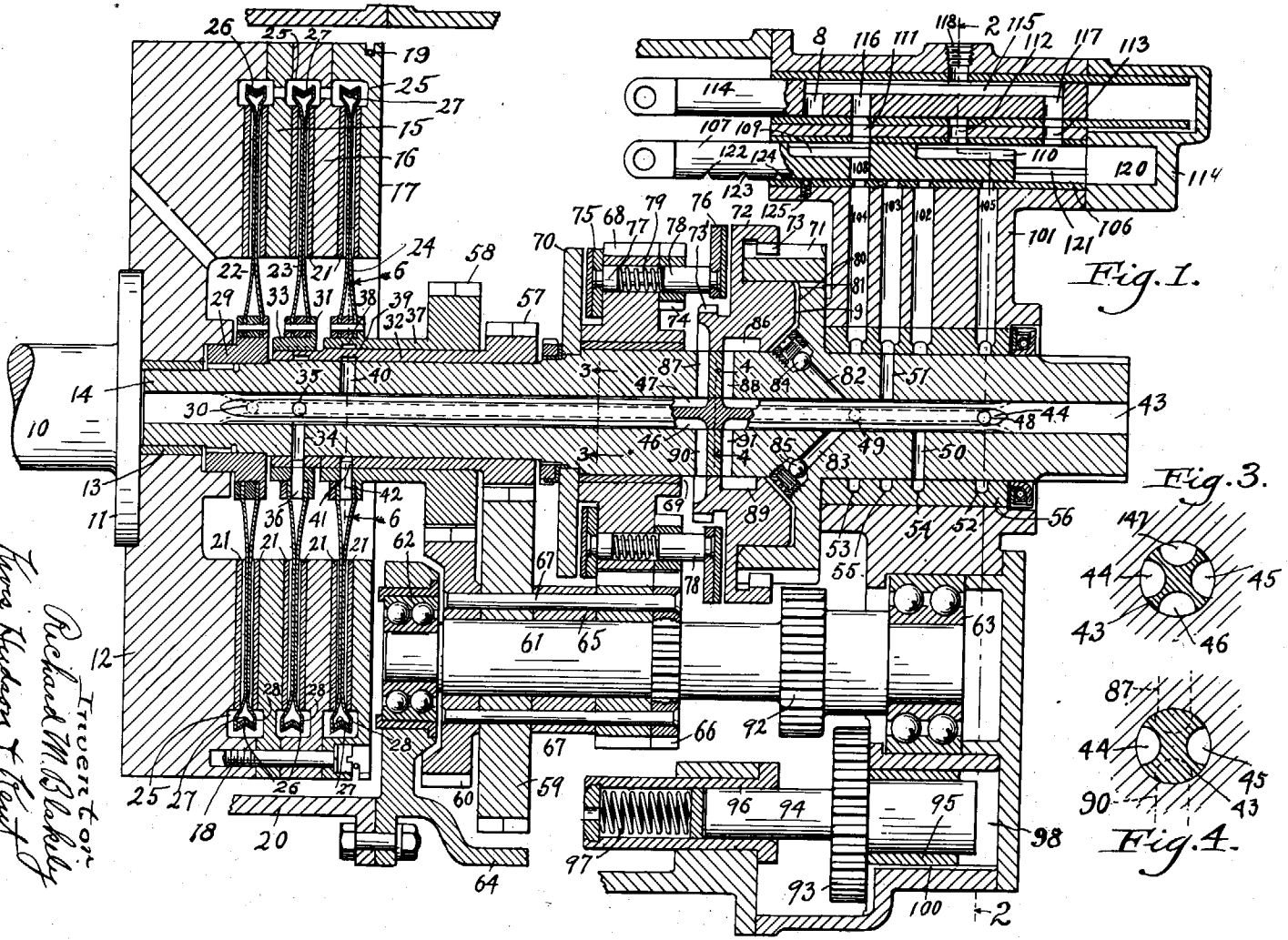
Figure 2:
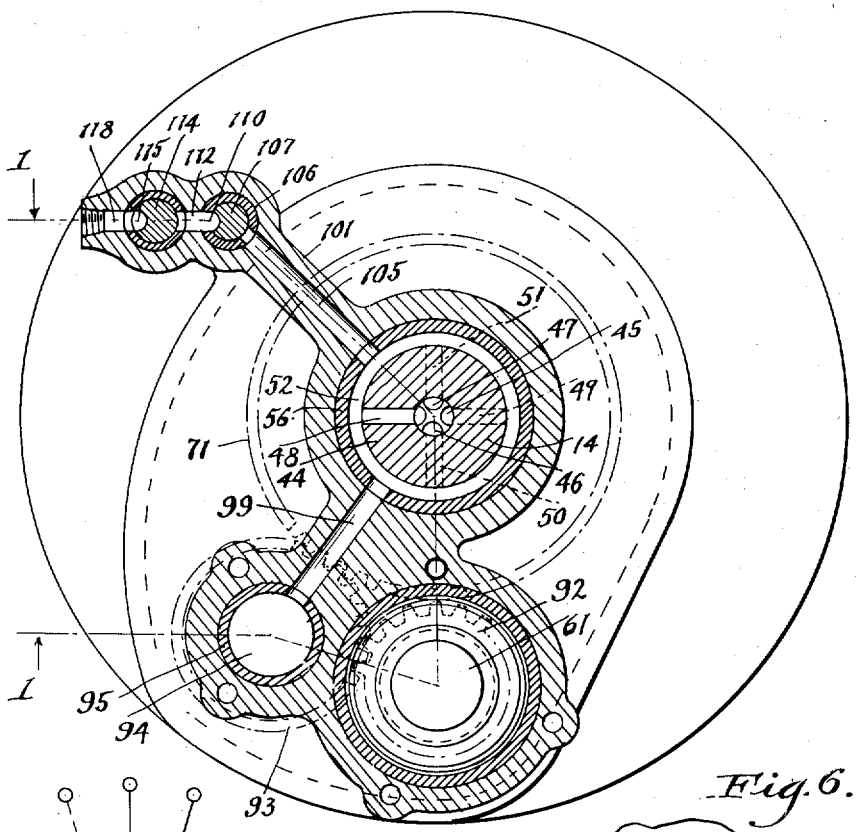

Other objects and features of novelty will appear as I proceed with the description of that embodiment of the invention which, for the purposes of the present application, I have illustrated in the accompanying drawings, in which Figure 1 is a longitudinal sectional view through a transmission mechanism embodying the invention, the view being taken substantially on line 1—1 of Figure 2, certain portions of the mechanism being swung out of their natural planes in order to more readily illustrate the invention.

Figure 2 is a cross sectional view taken substantially on the line 2—2 of Figure 1.

Figures 3 and 4 are fragmental detail sectional views taken substantially on the lines 3—3 and 4—4 respectively of Figure 1.

Figure 5:
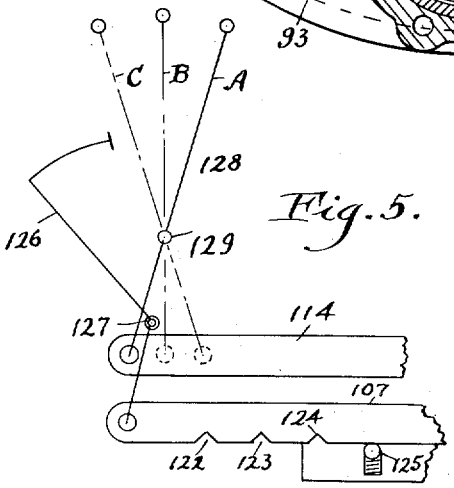
Figure 6:
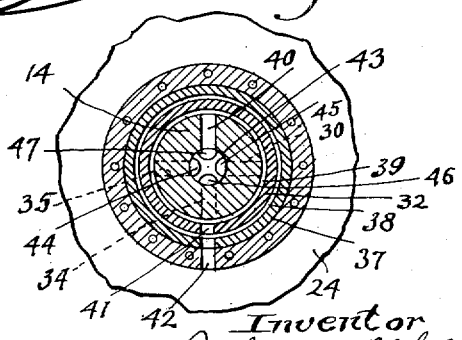

Figure 5 is a diagrammatic view illustrating an arrangement of control levers which may be employed in connection with the invention, Figure 6 is a detail cross sectional view taken substantially on the line 6—6 of Figure 1.

The invention comprises constant mesh gear trains for low and intermediate speed, a reverse gear train having an idler which is normally out of mesh, means for clutching either of said forward gear trains to both the fly-wheel and the driven shaft, means for clutching the reverse gear train to the fly-wheel and at the same time shifting the said idler into mesh and means for clutching the fly-wheel directly to the driven shaft. In the latter case the gear trains remain idle. The gears of the forward trains remain in mesh constantly, so that clash in shifting is avoided. The operation of the transmission, including the setting of the various clutches, is effected hydraulically, the operator moving a valve or valves which control the flow of oil from a pressure pump to perform the necessary operations. In the preferred embodiment a single valve is caused to slide across the oil passages leading to the forward speed clutches, opening and closing those passages in succession, rapidly if desired, and by motion of the valve in a single direction, permitting very smooth and rapid shifting through the lower speeds to direct drive, and the most efficient application of power to accomplish a quick acceleration of the vehicle speed. The clutches employed are extremely simple in design, having no springs or tension arms nor any means of adjustment, the adjustment being automatic.

In the drawings, the rear extremity of an engine crank shaft is indicated at 10 and the flange thereon at 11. This flange carries a fly-wheel 12 which is bored out centrally to receive a bushing 13 in which the forward end of the driven shaft 14 has its bearing. On the rear side of the fly-wheel 12 are mounted three spaced annular plates 15, 16, and 17 that are secured to the fly-wheel by a series of studs 18, these studs being held against displacement by a lock wire 19. 20 represents the usual fly-wheel housing.

In the rear face of the fly-wheel 12, on both faces of the plates 15 and 16, and on the forward face of plate 17 I mount annular linings 21 of material having a high friction coefficient. These linings with their backing plates constitute the driving elements of the three clutches.

The driven plates 22, 23, and 24 consist of pairs of sheet metal diaphragms. At their peripheries these diaphragms flare outwardly, the fly-wheel and plates 15, 16, and 17 being provided with annular cavities 25 to receive these outwardly flared portions of the diaphragms. At their peripheries the diaphragms of each plate have rebent flanges 26 which enclose a split ring 27 of metal of shallow V-section. When the diaphragms expand under pressure, or when they contract as the pressure is relieved, the ring 27 accommodates itself to them and maintains a joint sufficiently tight. Each of the driven plates of the clutch is provided near its periphery with a small port 28 which serves as a bleed hole.

The driven clutch plate 22 is mounted upon a dog ring 29, which is splined or otherwise secured to the driven shaft 14. The inner edges of the diaphragms of the plates are spaced apart, and the space enclosed by the diaphragms is connected with a bore 30 that extends radially through the dog ring 29 and the shaft 14. The diaphragms of clutch plate 23 are mounted in a similar manner upon a dog ring 31 which is secured to a sleeve 32. This sleeve has an internal annular groove 33 therein which communicates with two radial bores 34 and 35 through the shaft 14 and with a bore 36 through the dog ring 31.

The diaphragms of the clutch plate 24 are mounted in a similar manner upon a sleeve 37 which is provided with an internal annular groove 38. The sleeve 32 opposite the groove 38 has another internal groove 39 formed therein. The groove 39 communicates at all times with a radial bore 40 in the shaft 14. A port 41 in sleeve 32 connects grooves 38 and 39, and groove 38 is connected by a bore 42 with the space enclosed by the diaphragms of clutch plate 24.

The bores 30, 34, 35, and 40 are all connected with separate longitudinal pressure fluid passages running through the shaft 14. In order to provide these passages economically I bore through the shaft axially and mount in the bore thus formed a cylindrical plug 43 which is grooved to provide the necessary longitudinal passages. Two of these grooves 44 and 45 are continuous, and communicate with the bores 35 and 30 respectively. The two remaining grooves 46 and 47, are interrupted at a point intermediate their length, as indicated at the section line 4—4 of Figure 1.

Near their rear ends these grooves 44, 45, 46, and 47 connect with bores 48, 49, 50, and 51 respectively. These bores in turn connect with internal annular grooves 52, 53, 54, and 55 respectively formed in a bushing 56 surrounding the rear end of shaft 14.

At the rear end of sleeve 32 there is a gear 57. The rear end of sleeve 37 terminates in a somewhat larger gear 58. Gears 57 and 58 mesh with gears 59 and 60 respectively that are secured upon a jack shaft 61, which may be mounted in bearings 62 and 63 carried by the transmission casing 64. Adjacent the gear 59 the shaft 61 is surrounded by a spacing collar 65, and adjacent to that there is a small gear 66. Bolts 67 secure the gears 59, 60, and 66 and the collar 65 together, it being understood that they may be formed as an integral cluster if desired.

The gear 66 meshes constantly with a gear 68 that is rotatable upon a bushing 69 surrounding the shaft 14. The hub of this gear is adapted to abut against a friction plate 70 which is locked to the shaft 14. All of the gears thus far mentioned are in mesh constantly, and are preferably herring bone gears for the sake of quietness and freedom from end thrust.

Integral with or locked to the shaft 14 there is a spur gear 71. 72 is a sliding coupler having teeth 73 which interengage with the teeth of gear 71. On its forward side this coupler carries teeth 73 which are adapted to intermesh with internal teeth 74 on the gear 68. In order to bring the speed of gear 68 up to that of the shaft and gear 71 before the coupling is made, I provide gear 68 with a pair of annular friction plates 75 and 76 adapted to frictionally engage the plate 70 and the coupler 72 respectively. These two friction plates 75 and 76 are mounted upon telescoping pins 77 and 78 mounted in bores formed in the gear 68 and separated by coil springs 79. When the coupler 72 is moved forward from the position illustrated in Figure 1, it engages plate 76, starting the rotation of gear 68. Next it causes the plate 75 to engage plate 70, and these two friction clutches serve to rapidly synchronize the speed of the gear with that of the shaft. Hence when the teeth 73' start to engage the teeth 74 the two elements are rotating at the same speed and the coupling is made without clash.

The coupling 72 is fitted to the shaft 14 with just sufficient clearance to enable it to slide readily thereupon. There is also a good sliding fit between the coupler and an internal wall 80 on gear 71. The hub of coupler 71 is elongated to the right as seen in Figure 1, to form an actuating plunger or piston slidable within a cylinder or chamber 9 formed within the hub of gear 71. The space between these interfitting cylinder and plunger portions thus constitutes an expansible chamber 9, which is provided with a bleed hole 81. Pressure fluid may be let into this chamber through either one of two passages 82 and 83, which are equipped with check valves 84 and 85 respectively, these valves preventing the flow of pressure fluid from the chamber 9 back into either of the passages 82 and 83. Passage 82 connects with groove 47, and passage 83 with groove 46. When pressure fluid is let into the chamber 9, and the coupler 72 slides forward in response thereto, a pocket 86 in the coupler is caused to bridge the outer extremities of radial passages 87 and 88, and a pocket 89 in the coupler is caused to bridge the outer extremities of radial passages 90 and 91, respectively. It should be understood that the pockets 86 and 89 are entirely separate and unconnected. By means of these pockets the two parts of each of the grooves 46 and 47 are brought into communication so that pressure fluid may flow along these grooves throughout their lengths.

On the shaft 61 opposite the gear 71 there is a spur gear 92, and interposed between these two gears there is an idler gear 93, which is normally out of mesh, as indicated in Figure 1. The latter gear is fixed upon a shaft 94 that is mounted to slide longitudinally, one portion of large cross section being mounted in a bushing 95, and another portion of smaller cross section being mounted in a bushing 96 which also contains a coil spring 97 working against the end of the shaft to hold it normally in the position of Figure 1. Behind the larger end of this shaft there is a pocket 98 which is in communication through a passage 99 with the groove 52 in bushing 56. See Figure 2. Hence, whenever pressure fluid enters the groove 52, it flows into the pocket 98 and forces the shaft 94 toward the left—Figure 1—against the action of spring 97. The pocket 98 is bled through a small groove 100 in the casing, so that whenever flow of pressure fluid into the pocket 98 ceases, the pressure behind shaft 94 is dispelled and spring 97 returns it to the normal position illustrated in Figure 1.

In a web 101 of the casing there are formed a series of passages 102, 103, 104, and 105 which connect with grooves 54, 55, 53, and 52 respectively. 106 is a cylindrical bushing having ports therethrough registering with the passages 102, 103, 104, and 105 and constituting outlet ports for the cylindrical slide valve 107, which is mounted in the bushing 106 and movable by the operator to direct fluid through any of said outlet ports as desired. Through the valve 107 there is a passage 108 with which a longitudinally extending pocket 109 communicates. A second longitudinally extending pocket 110 runs out at the rear end of the slide. In the casing in which the slide valve is mounted there are three ports 111, 112, and 113 connecting the valve chamber in which valve 107 is mounted with a second valve chamber of similar shape in which a valve piece 114 slides. This latter valve piece is provided with a longitudinally extending pocket 115, from which open three ports or passages 8, 116, and 117. The casing is provided with a pressure fluid inlet port 118 which communicates at all times with a longitudinal pocket 115. A tube, not shown, leading from a positive pressure oil pump or the like may be attached to the casing at the port 118. A cap 119 closes the rear ends of the two valve chambers, and in this cap I form a pocket 120 for the reception of pressure fluid delivered through the pocket 110 of the valve 107. This pressure tends to force the valve piece toward the left, or to hold it in the direct drive position shown in Figure 1. A groove 121 running lengthwise of the bushing 106 serves to bleed the pocket 120.

A series of notches 122, 123, and 124 in the valve piece 107 cooperate with a spring detent 125 mounted in the casing to releasably hold the valve piece in any one of three positions when it is not subject to pressure, this detent also serving, by interposing a slight additional resistance to movement, to apprise the operator when the valve is properly centered in one of its operative positions. The means to be employed for movement of the valve pieces 107 and 114 may be varied considerably. I prefer to make the control of both of these valves manual, although valve 107 is actuable by fluid pressure toward the higher speed positions and automatic operation thereof is regarded as within the scope of the invention in some of its aspects. In Figure 5 I have indicated a foot pedal 126 pivoted at 127 and pivotally connected to the forward end of valve piece 107, by means of which the valve piece may be restrained and/or moved rearwardly against the fluid pressure acting upon it, the pedal thus providing the driver with means for over-controlling the fluid-induced actuation of valve 107. Connected to the valve piece 114 I have shown a lever 128 pivoted at 129, by means of which the valve may be moved to any one of three positions corresponding to the lever positions A, B, and C.

*Operation*

Assuming that the engine is running, that lever 128 is in position C, where the two ports 111 and 113 are cut off, the operator then puts his foot upon the lever 126 and depresses it until the third click indicates that the detent 125 is in engagement with the notch 122, when the valve piece 107 will be in the neutral position. In that position the passage 108 through the valve will be located mid-way between the passages 102 and 105. Then the operator, keeping his foot upon the lever 126, shifts lever 128 from position C, to position A, which is the normal running position illustrated in Figure 1. Further manipulation of the lever 128 will not again be necessary, under ordinary circumstances, until the driver's destination is reached. Pressure fluid now enters pocket 120 through port 118, elongated pocket 115 and passages 117 and 113. The driver now permits this pressure fluid to move the valve 107 forward slowly. The passage 108 will then come gradually into register with passage 102, whereupon pressure fluid will flow through groove 54 and passage 50 into the rear part of groove 46. Thence the liquid will flow through passage 83 and check valve 85 into the cylinder-chamber 9, formed in the hub of gear 71, causing the coupler 72 to move forward and locking the gear 68 to the gear 71. At this time both of these gears will be standing still. As soon as the pocket 89 bridges the two passages 91 and 90, liquid will flow from the rear portion of groove 46 through passage 91, pocket 89, and passage 90 into the forward portion of groove 46. The liquid following this groove will flow through passage 34 and groove 33 into passage 36, and will then fill the space between the diaphragms of clutch plate 23. These diaphragms will immediately expand and grip the linings 21 on the fly-wheel, with the result that the fly-wheel will drive sleeve 32 and gear 57 thereon. After the diaphragms expand a small flow of liquid will continue, owing to the fact that some of it is escaping constantly through the bleed hole 28.

The gear 57 then drives gear 59, which transmits rotation to the shaft 61 and the gear 66, and that gear being in mesh with gear 68 which is locked through coupler 72 to gear 71 fixed on the shaft, rotation is transmitted to shaft 14 at reduced speed. The train of gears 57, 59, 66, 68 is the low speed train. The vehicle begins to move forward as soon as the diaphragms of the clutch plate 23 begin to grip the fly-wheel. The operator then, in allowing the foot pedal to move outward, causes the passage 108 in valve 107 to move slowly over the entrance to outlet passage 102. When the two passages 108 and 102 are out of register and the flow of pressure fluid to clutch plate 23 is thus interrupted, the port 28 in that plate quickly bleeds enough liquid out of the plate to release the clutch. At the same time the flow of liquid to chamber 9 is interrupted, and the liquid in that chamber is bled through passage 81, enabling springs 79 to push the coupler 72 back into the inoperative position of Figure 1.

Continued forward movement of valve 107 to a higher speed position occurs when the driver allows pedal 126 to move still further outward (toward the rear of the vehicle), to an intermediate position denoted by engagement of notch 123 with the detent. This brings passage 108 into communication with the second speed outlet passage 103, which enables liquid to flow through groove 55, passage 51, the rear part of groove 47, passage 82 and check valve 84 into chamber 9. The coupler 72 then moves forward to operative position, locking the two gears 68 and 71 together, and causing pocket 86 to bridge passages 87 and 88, whereupon liquid flows along the entire length of groove 47, through radial passage 40, annular groove 39, radial passage 41, annular passage 38 and radial passage 42 into the space between the diphragms of clutch plate 24, which is the intermediate speed clutch. By this means sleeve 37 and gear 58 are locked to the fly-wheel. Power is then transmitted through gear 58, gear 60, gear 66 and gear 68, and thence to gear 71 and shaft 14. Power is thus transmitted to the vehicle at a higher speed ratio, and the speed of the vehicle increases.

The operator, when ready to permit engagement of the high speed (direct) drive, merely releases further his restraint of the pedal, allowing the movement of valve 107 to continue in the same direction. This gradually moves the passage 108 of the valve away from registry with passage 103, thereby releasing clutch plate 24 and permitting coupler 72 to disengage gear 68. Further forward movement of the valve causes passage 108 to register with the third or high speed outlet passage 104, whereupon liquid flows through groove 53 and passage 49 into shaft groove 45, which is continuous, and thence through passage 30 into the space between the diaphragms of clutch plate 22. Shaft 14 is thereby clutched to the fly-wheel, and the transmission is in direct drive.

Throughout the three positions of the valve 107 thus far described, that is low, intermediate and high positions, pressure fluid acts upon the rear end of the valve to urge it forward, the oil for this purpose passing through port 118 along pocket 115, passages 117 and 113, and pocket 110. When the valve reaches its farthest forward position, that is high gear position, the operator may remove his foot from the foot pedal and the pedal will be maintained in that position by the oil pressure behind it. Of course it will be understood that other means, such for instance as spring means, might be substituted for oil pressure as the means for inducing forward movement of the valve, but oil pressure is preferred for a reason which will presently appear.

Whenever the driver desires to change from direct drive to second speed or low speed, he places his foot upon pedal 126 and moves it forward to move the valve 107 rearward until the first or second click is heard or felt. Any change from any forward speed to any other forward speed may be made without shock or gear clash.

It is impossible for the driver to unintentionally place the transmission in reverse gear while the lever 128 is in the driving position A which corresponds to the position of valve 114 in Figure 1, because when he moves the valve 107 to cause passage 108 to register with passage 105 the pocket 109 is out of register with the passage 111, which is only capable of feeding fluid for the said speeds. When it is desired to move the vehicle rearwardly, the valve 107 is moved rearwardly as far as it will go, in other words until the passage 108 is in register with the passage 105 and the pocket 109 in register with the reverse feed passage 112. Then the operator grasps lever 128 and moves it to position C, causing passage 116 to be brought into register with reverse feed passage 112. Pressure fluid then flows through port 118, passages 116 and 112, pocket 109 and passage 108 into passage 105. It then flows through groove 52, passage 48 and continuous shaft passage 44 into low speed clutch plate 23 by way of radial passage 35, annular groove 33 and radial passage 36. In this operation, it will be noted, the gears 68 and 71 are not locked together. At the same time pressure fluid will flow from groove 52 through passage 99, Figure 2, into chamber 98, thereby driving shaft 94 forwardly to bring idler gear 93 into mesh with gears 71 and 92. Driving force is then transmitted from the flywheel through clutch plate 23, sleeve 32, gear 57, gear 59, shaft 61, gear 92, gear 93, and gear 71, to shaft 14, the direction of rotation of the latter shaft being reversed owing to the additional gear in the train.

When the valve 107 is in reverse position no pressure fluid flows into the chamber 120, owing to the fact that the passage 117 is out of register with the passage 113, and that the liquid in the chamber is bled out through the groove 121. Hence there is no force tending to move the valve 107 forward. Now, when the driver desires to proceed in a forward direction again, he first places his foot upon pedal 126, and then shifts lever 128 into driving position A. Oil then flows into chamber 120 and moves valve 107 forward against the pressure of the operator's foot, as far as he permits it to go. If his foot were not on the pedal the valve might move forward into high gear position too rapidly.

Should it become necessary at times to keep the transmission in low or intermediate gear for a considerable period, the operator may remove his foot from the pedal 126, provided he first moves lever 128 to its middle position B. The position of valve 114 corresponding to position B of the lever brings passage 8 into communication with the said drive fluid feed passage 111, whereby a continuous supply of oil is provided to the passage 102 or 103, as the case may be. The passage 117 however is then out of communication with passage 113, and no oil is supplied to the chamber 120. The pressure there is quickly dissipated through the groove 121, and the detent 125 extending into one of the notches 124 or 126 serves to hold the control valve 107 against unintentional movement.

It will be observed that when the transmission is in direct drive, none of the gears rotate. When it is in one of the other forward speed ratios, all of the gears except idler 93 rotate, but the gears 92 and 71 are not in mesh. The gears which are in mesh constantly may be so made as to be relatively quiet. When the transmission is in reverse gear all of the gears rotate.

In the foregoing description I have necessarily gone somewhat into detail in order to explain fully the particular embodiments of the invention herein illustrated, but I desire it to be understood that such detailed disclosures are not to be construed as amounting to limitations, except as they may be included in the appended claims.

Having thus described my invention, I claim:

1. In a transmission mechanism, a driving element, a driven shaft, a sleeve rotatably mounted thereon, a gear secured upon said sleeve, a gear secured upon said shaft, a reverse gear train interposed between said sleeve gear and shaft gear, one gear of said train being normally out of driving relation, and means simultaneously operated for clutching said sleeve to said driving element and for placing said last-named gear in driving relation.

2. In a transmission mechanism, a driver, a driven shaft, a gear train the final gear of which is rotatably mounted upon said shaft, a coupling keyed to slide upon said shaft into engagement with said final gear, and hydraulic means adapted to move said coupling into engaging position and thereafter to clutch the first gear of said train to said driver.

3. In a transmission mechanism, a driver, a driven shaft, a reduction gear train having its first gear rotatably mounted upon said driven shaft, a friction clutch interposed between said driver and said driven shaft, a second friction clutch interposed between said driver and said first gear, said clutches being adapted to be set by fluid pressure, said shaft having pressure fluid passages therein communicating with said clutches respectively, valve means for controlling the flow of pressure fluid through said passages, and means associated with said driven shaft and operated by said fluid pressure for breaking said gear train when said first named friction clutch is set.

4. In a transmission mechanism, a driver, a driven shaft, a reduction gear train having its first gear rotatably mounted upon said driven shaft, a friction clutch interposed between said driver and said driven shaft, a second friction clutch interposed between said driver and said first gear, said clutches being adapted to be set by fluid pressure, said shaft having pressure fluid passages therein communicating with said clutches respectively, a valve movable in one direction for admitting pressure fluid to the passage leading to the second named clutch, for then cutting off the flow of fluid to said passage, and for thereafter admitting fluid to the passage leading to the first named clutch, and means associated with said driven shaft and operated by the pressure fluid flowing to said first named clutch for breaking said gear train when said first named clutch is set.

5. In a transmission having direct drive, a speed reduction drive and a reverse drive, a driver, a driven shaft, a clutch for each of said drives, said clutches being adapted to be operated hydraulically, said driven shaft having passages therethrough for conducting pressure fluid to the respective clutches, a valve for admitting fluid selectively to the passages leading to said direct and speed reduction drives, and separate valve means with separate manual actuating means for controlling the flow of pressure fluid to said reverse drive clutch.

6. In a hydraulically operated transmission mechanism adapted to provide a plurality of speeds forward and a reverse speed, a pressure fluid conductor having passages therein for each of said speeds, a valve adapted to admit pressure fluid to any one of said passages, and a second valve controlling the flow of pressure fluid to the forward speed passages or to the reverse speed passage alternatively.

7. In a hydraulically operated transmission mechanism adapted to provide a plurality of speeds forward and a reverse speed, a pressure fluid conductor having passages therein for each of said speeds, a valve adapted to admit pressure fluid to any one of said passages, means for causing pressure fluid to urge said valve toward a given position, and manually operable means for moving it in the opposite direction.

8. In a transmission mechanism, a rotatable hub, a friction clutch comprising a pair of spaced diaphragms mounted on said hub, friction clutch plates rotatably mounted about the axis of said hub and arranged on opposite sides of said diaphragms, said diaphragms near their peripheries being flared outwardly and provided at their peripheries with inwardly directed peripheral flanges, a split ring of resilient material within the diaphragms expanded against the internal surfaces of said flanges, and closing the joint therebetween, and means for introducing pressure fluid through said hub into the space between said diaphragms, said diaphragms having a relief port through which the pressure fluid may be discharged at a rate below the maximum rate of entry into said space.

9. In a hydraulically operated transmission mechanism, a driving member, a driven shaft, a gear train, a hydraulically operated clutch for connecting said driving member and said shaft, a second hydraulically operated clutch for connecting said driving member and said gear train, said shaft having passages therethrough for carrying pressure fluid to either of said clutches selectively, the fluid passage to said second clutch being normally interrupted, means movable upon said shaft for bridging over the interrupted portion of said passage, said means being automatically actuated by pressure fluid flowing in the passage to said second clutch, said means when in operative position connecting said gear train to said shaft.

10. In a transmission mechanism, a driver, a driven shaft, two reduction gear trains each having its first gear rotatably mounted upon said driven shaft, friction clutches interposed between said driver and the first gears of said reduction trains, said clutches being adapted to be set by fluid pressure, said driven shaft having pressure fluid passages therein communicating with said clutches respectively, a coupling element for locking the final gear of each train to the driven shaft, cylinder and plunger portions for moving said coupling into operative position, said driven shaft having fluid connections therein for joining said passages with said cylinder portion, and check valves in said fluid connections for preventing a reverse flow of fluid.

11. In a transmission, a propeller shaft having a gear fixed thereupon, a gear rotatably mounted on the shaft, a speed reduction train including said rotatably mounted gear as the final element in the train, a reverse gear train including said fixedly mounted gear as the final element in the train, means for coupling or uncoupling said rotatably and fixedly mounted gears, and means for disconnecting said reverse gear train when said rotatably and fixedly mounted gears are coupled together.

12. In a transmission mechanism, a driving element, a driven shaft, a sleeve rotatably mounted upon said shaft, a gear rotatably mounted upon said shaft, gearing interposed between said gear and said sleeve, means for clutching said driving element and driven shaft together, means simultaneously controlled for clutching said driving element to said sleeve and said gear to said driven shaft, and means for disengaging one of said last named clutching means while the other is in engagement.

13. In transmission mechanism, a driven shaft, two sleeves rotatably mounted upon said shaft, a driving element, a gear rotatably mounted upon said shaft, change speed gear trains of different ratios interposed between said respective sleeves and said gear, means for clutching said driving element to said shaft, means alternatively operable for clutching one or the other of said sleeves to said driving element and clutching said gear to said shaft while the gear remains in its train, and means acting while one of said last named clutching means is in engagement for disengaging the remaining clutching means.

14. In a transmission mechanism, a driving member, a driven shaft, a gear rotatably mounted upon said shaft, means for clutching said gear to said drive member, a jack shaft, a gear thereon meshing with said first named gear, a third gear loosely mounted on said driven shaft, a fourth gear fixed upon said jack shaft meshing with said third gear, a fifth gear fixed upon said driven shaft, means for driving said fifth gear from said jack shaft, means for disconnecting the driving means for said fifth gear, and means for coupling said third and fifth gears together, or uncoupling them.

15. In a transmission construction, in combination with a source of power, substantially coaxial driving and driven shafts adapted to be actuated thereby, and a source of fluid under pressure, means for coupling said driving and driven shafts at different ratios including a gear train, a plurality of fluid-operable friction clutches including one for connecting said shafts through said gear train and one for directly connecting said shafts, said clutches being arranged concentrically with respect to the shafts and grouped upon one side of the gear train between the source of power and driven shaft, and means for operating said clutches including valvular controlling means, a passageway system extending longitudinally of one of said shafts through said gear train and terminating at one end at said clutching means to provide connection therewith, and fluid supply connecting means encircling the shaft and the other end of the passageway system upon the opposite side of said gear train from the clutches and providing running connection between the valvular controlling means and said passageway system.

16. In a transmission, in combination with a source of fluid under pressure, a driving member, a driven shaft, torque converting means potentially connecting said member and shaft, a plurality of fluid-operable friction clutches, one of said clutches being for rendering said torque converting means effective and ineffective, and another to connect said driving member and shaft at a different relative driving ratio, valvular means movable in one direction to a position to actuate that one of said clutches rendering said torque converting means effective, and movable to another position to effect a driving connection between said driving member and shaft at a lower torque ratio, valve-operating means urging said valvular means toward said last mentioned position, driver-operable restraining means for holding said valvular means against the pressure of the valve-operating means to prevent movement thereof in said direction only, and additional means for preventing movement of said valvular means in either direction.

17. In a transmission, in combination with driving and drivable torque transmitting members, coupling means including a plurality of engageable and disengageable clutching elements adapted to connect the driving and drivable members in different relative torque ratios, pressure fluid operable means for controlling the actuation of said coupling means including a pressure fluid actuated control valve, personally operable over-controlling means for mechanically regulating movement of said valve, said over-control means including means for moving or restraining movement of the valve against the effort of the pressure-actuating means, and means for rendering the pressure-actuating means ineffective to move the valve.

18. In a transmission, in combination with driving and drivable torque transmitting members, coupling means including a plurality of engageable and disengageable clutching elements adapted to connect the drivable and driven members in different relative torque ratios, pressure fluid operable means for controlling the actuation of said coupling means including a pressure fluid actuated control valve, personally operable over-control means for mechanically regulating movement of said valve, said over-control means including means for moving or restraining movement of the valve against the effort of the pressure-actuating means, and means including another valve in series with the first for rendering the pressure-actuating means ineffective to move the valve.

19. In a transmission, in combination with a source of fluid under pressure, a driving member, a driven shaft, gearing potentially connecting said member and shaft, a plurality of friction clutches, one for rendering said gearing effective and ineffective to connect said member and shaft at one ratio, another of said clutches when engaged acting to connect said member and shaft at a different relative driving ratio, fluid-pressure operable actuating means for said clutches, valvular means for selectively directing pressure fluid from said source to different ones of said clutch-actuating means to operate the same, valve-actuating means for urging the valve in one direction, and driver operable control means movable independently of the valve for rendering said actuating means inoperative to move the valve, whereby said valve may be maintained in any of various positions of adjustment.

20. In a transmission, in combination with a source of fluid under pressure, a driving member, a driven shaft, gearing arranged in a plurality of trains potentially connecting said member and shaft at different ratios, a plurality of friction clutches, one for rendering each of said trains effective and ineffective, fluid pressure operable means for controllingly actuating said clutches, including valvular means for selectively directing pressure fluid from said source to different ones of said clutches to operate the same, fluid pressure operable means for urging said valve in one direction, and driver-operable over-control means for controlling movement of said valve.

21. A transmission construction as set forth in claim 20, in which said valve is movable by the over-control means in a direction opposite to that in which it is urged by the last mentioned fluid pressure operable means.

22. A transmission construction as set forth in claim 20 including means for cutting off the fluid supply to said means for urging the valve in one direction to render said means ineffective; without preventing flow of fluid to the clutches.

23. In a transmission, in combination with a source of fluid under pressure, driving and driven shafts, torque-converting means potentially connecting said shafts and a plurality of fluid-operable friction clutches, one of said clutches being connected to one of said shafts and to said torque-converting means and engageable and disengageable to render said means effective or ineffective, and another of said clutches engageable to connect said driving member and driven shaft at a different relative driving ratio, valvular means for selectively directing fluid from said source to different ones of said clutches to engage the same, said valvular means including a valve chamber and a valve movable therein, said clutches being disengaged when fluid flow thereto is discontinued, means defining a plurality of passageways, one extending to each clutch from a point on the shaft remote there-from, to conduct such pressure fluid longitudinally of the shaft to said clutches, manifold means mounted on the shaft and communicating with one end of each of said passageways, through which manifold means a fluid may be fed, the valvular means being mounted adjacent the manifold means, a plurality of feed ports formed in the manifold and opening directly into said valve chamber, across which ports the valve is slidable, said manifold and valvular means, the clutches, and the torque-converting means being grouped along the shaft in separate areas.

24. A transmission construction as set forth in claim 20 including a second valve controlling the operation of said last mentioned fluid pressure operable means for urging the valve in one direction.

25. In a transmission, in combination with a source of fluid under pressure, a driving member, a driven shaft, torque converting means potentially connecting said driving member and shaft, and a plurality of fluid operable friction clutches, one of said clutches being for rendering said torque converting means effective or ineffective, and another to connect said driving member and shaft at a different relative driving ratio, valvular means for controlling the delivery of pressure fluid from said source to different ones of said clutches to operate the same, said valvular means including at least two halves in series, one of said valves enabling selectively directing fluid to different ones of said clutches, and the other valve including a portion enabling interruption of such delivery, said first valve being fluid actuable, and said other valve also including a portion for controlling such fluid actuation of the first valve.

26. Apparatus as set forth in claim 25 including driver operable means independent of said fluid operable means for independently moving each of said valves.

27. Hydraulic actuating means for transmission mechanism of the variety including a plurality of hydraulically operated forward clutches and hydraulically operated means for engaging and disengaging a reverse drive, a plurality of gear units adapted to be placed in operation selectively by the setting of said clutches and said engaging and disengaging means, said actuating means comprising means for conducting pressure fluid to said clutches and to said means for engaging and disengaging the reverse drive, a pair of valves arranged in series in the path of flow of said fluid toward said clutches and said engaging and disengaging means, for the reverse drive, the first of said valves having forward and reverse outlet connections both of which are in series with the second valve, said first valve being adapted to divert the flow to either a forward or a reverse channel, and the second of said valves having a plurality of forward outlet connections adapted to direct the flow from the forward channel selectively to the forward clutches.

28. Hydraulic actuating means for transmission mechanism of the variety including a plurality of hydraulically operated forward clutches and hydraulically operated means for engaging and disengaging a reverse drive, a plurality of gear units adapted to be placed in operation selectively by the setting of said clutches and said engaging and disengaging means, said actuating means comprising means for conducting pressure fluid to said clutches and to said means for engaging and disengaging the reverse drive, a pair of valves arranged in series in the path of flow of said fluid toward said clutches and said engaging and disengaging means for the reverse drive, the first of said valves having forward and reverse outlet connections both of which are in series with the second valve, said first valve being adapted to divert the flow to either a forward or a reverse channel, and the second of said valves having a plurality of forward outlet connections in series with the forward outlet connection of the first valve, and a reverse outlet connection in series with the reverse outlet connection of the first valve, said second valve being thereby adapted to direct the flow from the forward channel selectively to the forward clutches and to control the flow of fluid from the reverse channel to the means for engaging and disengaging the reverse drive.

RICHARD M. BLAKELY.